United States Patent [19]
Gecker, Jr.

[11] Patent Number: 6,052,990
[45] Date of Patent: Apr. 25, 2000

[54] EXHAUST PIPE AND METHOD AND SYSTEM FOR ENHANCING ENGINE PERFORMANCE

[75] Inventor: Sheldon Gecker, Jr., Hornlake, Miss.

[73] Assignee: Competition Cams, Inc., Memphis, Tenn.

[21] Appl. No.: 09/339,198

[22] Filed: Jun. 24, 1999

Related U.S. Application Data

[60] Provisional application No. 60/090,738, Jun. 25, 1998.

[51] Int. Cl.⁷ ..................................................... F01N 3/10
[52] U.S. Cl. ............................... 60/312; 60/314; 60/322; 60/323; 181/227; 181/265; 285/157
[58] Field of Search .............................. 60/312, 313, 323, 60/322, 314; 181/227, 228, 241, 243, 265; D12/194, 114; 285/157

[56] References Cited

U.S. PATENT DOCUMENTS

| | | |
|---|---|---|
| D. 385,523 | 10/1997 | Borla ....................................... D12/194 |
| D. 414,452 | 9/1999 | Verlengiere ............................ D12/194 |
| 1,514,441 | 11/1924 | Culp . |
| 2,727,355 | 12/1955 | Wosika ....................................... 60/323 |
| 3,385,052 | 5/1968 | Holterman et al. . |
| 3,462,947 | 8/1969 | Nowak ......................................... 60/32 |
| 3,590,947 | 7/1971 | Latch et al. . |
| 3,665,712 | 5/1972 | Tenney . |
| 3,690,406 | 9/1972 | Weiss ................................... 181/36 B |
| 3,842,599 | 10/1974 | Ehlen . |
| 3,842,940 | 10/1974 | Bonikowski ............................. 181/50 |
| 3,875,744 | 4/1975 | Brooks et al. . |
| 3,968,854 | 7/1976 | Gordon et al. . |
| 3,993,160 | 11/1976 | Rauch ..................................... 181/53 |
| 4,290,501 | 9/1981 | Tanaka . |
| 4,360,076 | 11/1982 | Suyama . |
| 4,381,045 | 4/1983 | Buchwalder ........................... 181/265 |
| 4,531,364 | 7/1985 | Equi . |
| 4,735,283 | 4/1988 | Macaluso . |
| 5,392,602 | 2/1995 | Matsumoto . |
| 5,559,310 | 9/1996 | Hoover et al. . |

OTHER PUBLICATIONS

Advertisment for RLV Turbo Exhaust and Racing Products containing curved header marked "Patented," *National Kart News*, Jun. 1999.

*Primary Examiner*—Thomas Denion
*Assistant Examiner*—Binh Tran
*Attorney, Agent, or Firm*—Jones Jain, L.L.P.; Wilburn L. Chesser

[57] ABSTRACT

A double U shaped exhaust pipe having varying internal pipe diameters for increasing horsepower, designed within internal combustion engine vehicle racing or other rules that limit such features as overall size. A first stage portion of the exhaust pipe produces a first periodic flow of exhaust, with a vacuum pulse created where the pipe internal diameter increases upon the exhaust reaching a second stage portion. A third stage portion of the exhaust pipe produces a third stage periodic flow of exhaust upon the exhaust reaching an increased pipe internal diameter at a fourth stage portion. These periodic pulsed flows are matched to the opening of the intake and exhaust valves of the engine for a selected engine speed range. The matching of a vacuum pulse to the opening exhaust valve improves engine performance by drawing exhaust gases from the engine. The matching of a vacuum pulse to the opening intake valve, which overlaps with the exhaust valve being open, enhances engine performance by swirling or otherwise mixing intake air and fuel received into the engine, and by improving engine "breathing" by increasing the draw of intake air and fuel into the engine. The exhaust pipe is particularly useful with small, single-cylinder flathead engines for racing vehicles, as well as other engines that do not naturally breathe well. One exhaust pipe described includes features or use with a muffler attached at the end of the exhaust pipe, and a second described exhaust pipe is intended for use without a muffler.

36 Claims, 5 Drawing Sheets

| Description | Pipe 206 (muffled) | Pipe 207 (unmuffled) | Units |
|---|---|---|---|
| Length A of Straight Section 5a | 4.5 | 6.25 | inches |
| Length B of Combination Straight Sections 5c, 7, 8a | 2.0 | 3.25 | inches |
| Centerline to Centerline height E | 7.0 | 7.0 | inches |
| Length of 2nd Stage Portion 7 | 1.0 | 1.0 | inches |
| Length D of Fourth Stage Portion 10 | 1.125 | 3.25 | inches |
| Inner Diameter of First Stage Portion 5 | 0.990 | 0.990 | inches |
| Inner Diameter of Second Stage Portion 7 | 1.130 | 1.130 | inches |
| Inner Diameter of Third Stage Portion 8 | 0.990 | 0.990 | inches |
| Inner Diameter of Forth Stage Portion 10 | 1.130 | 1.130 | inches |
| Outside total length of all stages F | 37.25 | 39.25 | inches |
| Inside total length of all stages G | 31.0 | 38.5 | inches |

FIG. 3

EXHAUST PIPE AND METHOD AND SYSTEM FOR ENHANCING ENGINE PERFORMANCE

This application claims priority to applicant's copending U.S. Provisional Patent Application Ser. No. 60/090,738 of Sheldon Gecker, Jr., entitled "EXHAUST PIPE" filed Jun. 25, 1998.

FIELD OF THE INVENTION

The present invention relates to the field of exhaust or header pipes for internal combustion engines, and in particular to an exhaust pipe for enhancing the power of engines having particular size constraints, such as those meeting racing rules requirements for length or other dimensions.

BACKGROUND

Racing vehicles, particularly those for special class racing, such as single cylinder flathead engined vehicles, are subject to racing rules that specify a maximum distance between the exhaust port on the engine's head and the end of the vehicle chassis.

It is known in the art to specially design multiple bend exhaust pipes for two cycle engines, and it is also known in the art to specially design multiple bend exhaust pipes for four cycle engines for the purpose of reducing noise or for proper fitment. It is known in the prior art to provide straight exhaust pipes having successive sections of differing diameters, but it is not known in the prior art to have successive sections of differing diameters in combination with the use of two U shaped bends for meeting overall length or other requirements for exhaust pipes in conjunction with increasing performance.

For example, U.S. Pat. No. 3,590,947 to Latch et al. shows a muffler with a double U shape path, in which many complex U shaped sections of a single inner diameter within each U section are used in connection with baffles and alcoves, and in which entry and exit sections are provided that have larger inner diameters than the U shaped section. The muffler of Latch et al. is designed primarily to reduce noise and to reduce back pressure in the engine cylinders through the use of passageways having larger cross-sectional areas than the inlet port and outlet port of the muffler. The muffler of Latch et al. does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the muffler of Latch et al. is not designed particularly for use within single cylinder flathead or other racing engine constraints.

U.S. Pat. No. 4,381,045 to Buchwalder describes a double U shaped exhaust gas silencer that uses tubes of uniform inner diameter and end chambers having end walls with rounded and hollow bosses for redirecting gas flow. The exhaust silencer of Buchwalder does not include an exhaust pipe for use with or without a muffler, the pipe having only a double U shape path with varying inner diameters within the U sections for producing vacuum pulses and other flow characteristics that match the engine intake and exhaust valve opening over selected engine speed ranges and thereby enhance four cycle engine performance. In addition, the silencer of Buchwalder is not designed particularly for use within single cylinder flathead or other racing engine constraints.

U.S. Pat. No. 1,514,441 to Culp shows an exhaust trap having multiple headers and cooperating tubes and is particularly for use with a gas or locomotive engine. The exhaust trap of Culp is designed to create a vacuum for pull on the piston when the exhaust port opens. The exhaust trap of Culp does not include an exhaust pipe for use with or without a muffler, the pipe having only a double U shape path with varying inner diameters within the U sections for producing vacuum pulses and other flow characteristics that match the engine intake and exhaust valve opening over selected engine speed ranges and thereby enhance four cycle engine performance. In addition, the exhaust trap of Culp is not designed particularly for use within single cylinder flathead or other racing engine constraints.

U.S. Pat. No. 3,462,947 to Nowak shows an exhaust system particularly designed for increasing the efficiency of two stroke engines. The system of Nowak has divergent and convergent cones fitted within a sleeve, and sound muffling baffles and a reflector plate. The exhaust system of Nowak does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the exhaust system of Nowak is not designed particularly for use within single cylinder flathead or other racing engine constraints.

U.S. Pat. No. 3,665,712 to Tenney shows an exhaust system particularly designed for reducing the noise of two stroke engines in particular applications that limit the size of the system, such as chain saws. The exhaust system of Tenney includes a resonance chamber that has at least one change of direction or bend, and a silencing section located within the crook of the bend. The exhaust system of Tenney does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the exhaust system of Tenney is not designed particularly for use within single cylinder flathead or other racing engine constraints.

U.S. Pat. No. 3,690,406 to Weiss shows an exhaust noise silencer (FIG. 1), which includes a pipe having multiple U shaped bends for reducing exhaust noise without using a baffle arrangement. The exhaust noise silencer of Weiss does not include an exhaust pipe for use with or without a muffler, in which the pipe has a double U shape path with varying inner diameters within the U sections for producing vacuum pulses and other flow characteristics that match the engine intake and exhaust valve opening over selected engine speed ranges and thereby enhance four cycle engine performance. In addition, the exhaust noise silencer of Weiss is not designed particularly for use within single cylinder flathead or other racing engine constraints.

U.S. Pat. No. 3,842,599 to Ehlen shows an exhaust system, which is particularly designed for two stroke engines, that includes at least one working chamber, a tubular member with an expansion chamber for containing gases during the initial scavenging of the chamber, and a U shaped section. In addition, the system of Ehlen includes a contraction section for reflecting a positive pressure wave back to the exhaust port to retain combustible fluid within the working chamber. The exhaust system of Ehlen does not include an exhaust pipe for use with or without a muffler, the pipe having simply a double U shape path with varying inner diameters within the U sections for producing vacuum pulses and other flow characteristics that match the engine intake and exhaust valve opening over selected engine speed ranges and thereby enhance four cycle engine performance. In addition, the exhaust system of Ehlen is not designed particularly for use within single cylinder flathead or other racing engine constraints.

U.S. Pat. No. 3,968,854 to Gordon et al. shows a low noise level muffler for small engines, the muffler having an inlet tube and multiple chambers for dispersing and recombining exhaust gases to reduce noise. The muffler of Gordon et al. does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the muffler of Gordon et al. is not designed particularly for use within single cylinder flathead or other racing engine constraints.

U.S. Pat. No. 4,290,501 to Tanaka shows an exhaust silencer for reducing the exhaust noise of small, low-speed two cycle engines for vehicles having minimal space for the silencer, such as golf cars. The silencer of Tanaka includes a silencer chamber, an exhaust pipe with a U shape, and a generally conical expansion section extending into an encompassing chamber. The silencer of Tanaka does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the silencer of Tanaka is not designed particularly for use within single cylinder flathead or other racing engine constraints.

U.S. Pat. No. 4,360,076 to Suyama shows a muffler having an inlet pipe, outlet pipe, and main body, the pipes generally reversing the direction of exhaust flow and including apertures and other features for improving performance and reducing noise. The muffler of Suyama does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the muffler of Suyama is not designed particularly for use within single cylinder flathead or other racing engine constraints.

U.S. Pat. No. 4,735,283 to Macaluso shows muffler with flow direction plates, in which the flow direction plates are curved such that a generally double-U shaped exhaust path is produced. The low back pressure acoustic muffler of Macaluso is intended to provide improved performance simply by directing flow in a curved path at the muffler ends using curved plates. The muffler of Macaluso does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the muffler of Macaluso is not designed particularly for use within single cylinder flathead or other racing engine constraints.

U.S. Pat. No. 5,392,602 to Matsumoto shows an exhaust emission control device for scooter applications. The device of Matsumoto includes a single U shaped section and expansion chambers to allow sufficient length within the muffler to improve engine performance but reduce heat. The device of Matsumoto does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the device of Matsumoto is not designed particularly for use within single cylinder flathead or other racing engine constraints.

U.S. Pat. No. 5,559,310 to Hoover et al. shows muffler for air operated pumps, the muffler having a double flow path reversal in a generally double U shape for reducing noise without restricting pump performance. The muffler of Hoover et al. does not include an exhaust pipe for use with or without a muffler, the pipe having a double U shape path with varying inner diameters within the U sections for producing vacuum pulses and other flow characteristics that match the engine intake and exhaust valve opening over selected engine speed ranges and thereby enhance four cycle engine performance. In addition, the muffler of Hoover et al. is not designed particularly for use within single cylinder flathead or other racing engine constraints.

None of the prior art identified provides an exhaust pipe for use with four cycle engines for racing vehicles that is designed to increase horsepower within established racing or other size constraints through use of a pipe having a profile of a double U shaped path having varying inner diameters within various sections.

There is therefore a need for an exhaust pipe for overcoming these limitations and others by providing for increased horsepower within established racing or other constraints.

SUMMARY OF THE INVENTION

It is an advantage of the present invention to provide an exhaust pipe for use with four cycle engines for racing vehicles.

It is a further advantage of the present invention to provide an exhaust pipe that increases horsepower within established racing constraints, including overall length, for single cylinder four cycle flathead engines.

It is a further advantage of the present invention to provide an exhaust pipe that has a double U shaped path having varying inner diameters within the U sections.

The present invention provides an exhaust pipe for operation within engine vehicle racing rules, and particularly those applicable to single cylinder four cycle flathead engines, to increase the horsepower of the engine. In an embodiment of the present invention, the horsepower is increased approximately 10% (i.e., an 8 HP engine will produce approximately 8.8 HP) when the engine is operated using the exhaust pipe of the present invention, compared with prior art exhaust pipes.

Two embodiments are provided, although other embodiments will be apparent to those skilled in the art. A first embodiment, referred to as "Exhaust Pipe #206," is for use with a muffler attached to the end of the exhaust pipe, and the second embodiment, referred to as "Exhaust Pipe #207," is for use without a muffler, having a washer at the end of the exhaust pipe. Both embodiments are similar, but with differing dimensions, the differing dimensions addressing the additional "back pressure" within the exhaust pipe caused by the presence of a muffler.

Both embodiments include an exhaust pipe having a double U shaped profile with varying inner pipe diameters. In an embodiment of the present invention, the exhaust pipe may be described with respect to four stages of exhaust pipe portions, each stage portion including either a straight section or both a straight section and a curved section. The first stage portion is connected by, for example, a bracket, to the engine at the engine exhaust port or exhaust manifold. The first stage portion includes a long straight section connected to a curved section, with a short straight section at the second end of the curved section, such that the first portion has a generally J shaped profile.

Attached to the curved section of the second section is a second stage portion of the exhaust pipe. The attachment can be made, for example, using a welded joint. The second stage portion includes a straight section having a larger inner pipe diameter than the first stage portion.

Attached to the other end of the second stage portion is a third stage portion. The third stage portion, like the first portion, includes a longer straight section and curved section, as well as a short straight section, such that the third stage portion has a generally J shaped profile, the sections also having the same smaller inner diameter as the first stage portion. The short straight section is attached to the second stage portion, followed by the curved section, and the straight section extends from the curved section at the end opposite the attachment to the short straight section. According to an embodiment of the present invention, a bracket for attachment to the engine is located along the curved section of this stage portion.

In one embodiment, the combination of the first stage J shaped portion attached to the second stage portion, which is attached to the third stage J shaped portion, produces an exhaust pipe that reverses direction twice, having generally a double U shaped profile. At the end of the third stage portion straight section is attached a fourth stage portion that includes a straight section of the same larger inner diameter as the second stage section.

Exhaust from an engine to which the exhaust pipe is attached thus flows within the double U shaped pipe a distance much greater than the overall length of the pipe, as measured by the direct distance from the bracket to the end of the fourth stage portion of the pipe. Thus the flow length can be extended while the overall length of the pipe remains within, for example, racing or other constraints.

The varying lengths of the straight and curved sections, as well as the curvature and the varying inner diameters, produce a reverberating or periodically varying effect in the exhaust flow. This periodic or pulsed flow varies in length of period or pulse depending on the length of the straight and curved sections. Vacuum pulses are produced as part of the periodic exhaust variations, the vacuum pulses resulting from the expansion of exhaust gas from the smaller inner diameter portions into the large inner diameter portions of the pipe.

In order to improve engine performance, the periodicity of the exhaust flow within the pipe is matched to the periodicity of the flow of exhaust from the engine that occurs as a result of the normal internal combustion process of a typical engine. In a four cycle engine, the engine exhaust varies periodically as the exhaust valves and the intake valves open and close. An embodiment of the present invention enhances or otherwise optimizes engine performance by matching the period of the flow through the exhaust pipe to the engine exhaust period for a selected engine speed (revolutions per minute or RPM) range. In one embodiment, the selected range is 5000 to 6500 RPM. Included with the matched periodicity of the exhaust pipe flow are a matching of vacuum pulses to the opening of the intake and exhaust valves of a four stroke engine. The design for enhancement in the selected range does not detract from performance in other ranges of engine operation.

More specifically, in an embodiment of the present invention, the first stage portion of the exhaust pipe produces a first periodic flow of exhaust having a vacuum pulse, and the third stage portion of the exhaust pipe produces a third stage periodic flow of exhaust having a vacuum pulse. These periodic pulsed flows are matched to the opening of the intake and exhaust valves of the engine. The matched vacuum pulse to the opening exhaust valve improves engine performance by drawing exhaust gases from the engine. The matched vacuum pulse to the opening intake valve, which opens overlapped with the exhaust valve being open, enhances engine performance by swirling or otherwise mixing intake air and fuel received into the engine cylinder or cylinders. In addition, the intake matched vacuum pulse improves engine "breathing" by drawing more intake air and fuel into the cylinder or cylinders than would occur absent the vacuum pulse. Because certain types of engines naturally breath better than others, those engines that do not breath well are particularly amenable to enhanced engine performance using the present invention, such as flathead engines.

To achieve the stated and other advantages of the present invention, as embodied and described below, the invention includes a double U shaped exhaust pipe for an exhaust flow from an internal combustion engine having at least one cylinder, the exhaust flow from the engine exiting the engine in a first direction, comprising: a connecting portion for connecting the exhaust pipe to the engine; a first stage exhaust pipe portion connected to the connecting portion, the first stage portion including a first straight pipe section having a first end and a second end, the first straight pipe section extending from the connecting portion at the first straight pipe section first end, wherein the first straight pipe section has a first inner pipe diameter; a first curved pipe section having a first end and a second end, the first curved pipe section first end being attached to the first straight pipe section second end, wherein the first curved pipe section has the first inner pipe diameter, and wherein the first curved pipe section reverses the exhaust flow, such that the exhaust flow is in a second direction upon exiting the first curved pipe portion, the second direction opposite the first direction; and a second straight section having a first end and a second end, the second straight section first end being connected to the first curved pipe section second end, wherein the second straight section has the first inner pipe diameter; a second stage exhaust pipe portion, the second stage portion including a third straight section having a first end and a second end, the third straight section first end being connected to the second straight section second end, wherein the third straight section has a second inner pipe diameter; a third stage exhaust pipe portion, the third stage portion including a forth straight section having a first end and a second end, the forth straight section first end being connected to the third straight section second end, wherein the second straight section has the first inner pipe diameter; a second curved pipe section having a first end and a second end, the second curved pipe section first end being attached to the forth straight pipe section second end, wherein the second curved pipe section has the first inner pipe diameter, and wherein the second curved pipe section reverses the exhaust flow, such that the exhaust flow upon existing the second curved pipe section is in the first direction; and a fifth straight section having a first end and a second end, the fifth straight section first end being connected to the second curved pipe section second end, wherein the second straight section has the first inner pipe diameter; and a fourth stage exhaust pipe portion, the fourth stage portion including a sixth straight section having a first end and a second end, the sixth straight section first end being connected to the fifth straight section second end, wherein the sixth straight section has the second inner pipe diameter; wherein the second inner pipe diameter is greater than the first inner pipe diameter.

To achieve the stated and other advantages of the present invention, as embodied and described below, the invention further includes a method for enhancing performance for an optimal range of operation of an internal combustion engine having at least one cylinder and an exhaust flow through a double U shaped exhaust pipe of a selected maximum overall length, the exhaust pipe having a first partially curved section of a first inner diameter, the first end being connected to the internal combustion engine; a second straight section of a second inner diameter, the second straight section being connected to the first partially curved section; a third partially curved section of the first inner diameter, the third partially curved section being connected to the second straight section; and a fourth straight section of the second inner diameter, the fourth straight section being connected to the third partially curved section; wherein the second inner diameter is greater than the first inner diameter; and wherein the exhaust flow includes an exhaust pulse and an intake pulse; the method comprising: receiving the exhaust flow from the internal combustion engine into the first partially curved section; the exhaust flow traveling from the first partially curved section to the second straight section; the exhaust flow into the second straight section creating a first vacuum pulse returning via the first partially curved section to the internal combustion engine; the exhaust flow traveling from the second straight section to the third partially curved section; the exhaust flow traveling from the third partially curved section to the fourth straight section; and the exhaust flow into the fourth straight section creating a second vacuum pulse returning via the third partially curved section, the second straight section, and the first partially curved section to the internal combustion engine; wherein the first vacuum pulse and the second vacuum pulse reach the engine during the exhaust pulse and the intake pulse for the optimal range of operation of the internal combustion engine.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIG. 3 presents a table of dimensions of the various parts of exhaust pipes according to two embodiments of the present invention for particular racing restrictions;

DETAILED DESCRIPTION

An embodiment of the present invention provides a double U shaped exhaust pipe having varying internal pipe diameters for increasing horsepower, the exhaust pipe being designed within internal combustion engine vehicle racing or other rules that limit, for example, overall length. A first stage portion of the exhaust pipe produces a first periodic flow of exhaust, with a vacuum pulse created where the pipe internal diameter increases upon the exhaust reaching a second stage portion. A third stage portion of the exhaust pipe produces a third stage periodic flow of exhaust upon the exhaust reaching an increased pipe internal diameter at a fourth stage portion. These periodic pulsed flows are matched to the opening of the intake and exhaust valves of the engine for a selected engine speed range. The matching of a vacuum pulse to the opening exhaust valve improves engine performance by drawing exhaust gases from the engine. The matching of a vacuum pulse to the opening intake valve, which overlaps with the exhaust valve being open, enhances engine performance by swirling or otherwise mixing intake air and fuel that is received into the engine, and by improving engine "breathing" by increasing the draw of intake air and fuel into the engine through the intake valve over intake absent the vacuum pulse. The exhaust pipe is particularly useful with small, single-cylinder flathead engines for racing vehicles, and other engines that do not naturally breathe well. One exhaust pipe described includes features for use with a muffler attached at the end of the exhaust pipe, and a second described exhaust pipe is intended for use without a muffler.

The concept behind the header pipe of the present invention is use of properly timed frequencies, created by pressure and vacuum (resulting from engine events), to occur when the engine is in certain low breathing ability situations. When the crucial events for enhancing engine performance occur, the header pipe of the present invention, through its design, provides the engine with pressure and vacuum. Pressure and vacuum occurring with perfect timing provides the engine with the ability to receive the intake charge into the cylinder faster and to expel exhaust from the cylinder and the end of the pipe quicker.

Keys to the development of the features and dimensions of the present invention are the total length of the header pipe, the inside diameter of the pipe, the diameter of the bend, and the location and diameter of the pulse stage.

References will now be made in detail to embodiments of the present invention, examples of which are illustrated in the accompanying drawings.

Figure 1:
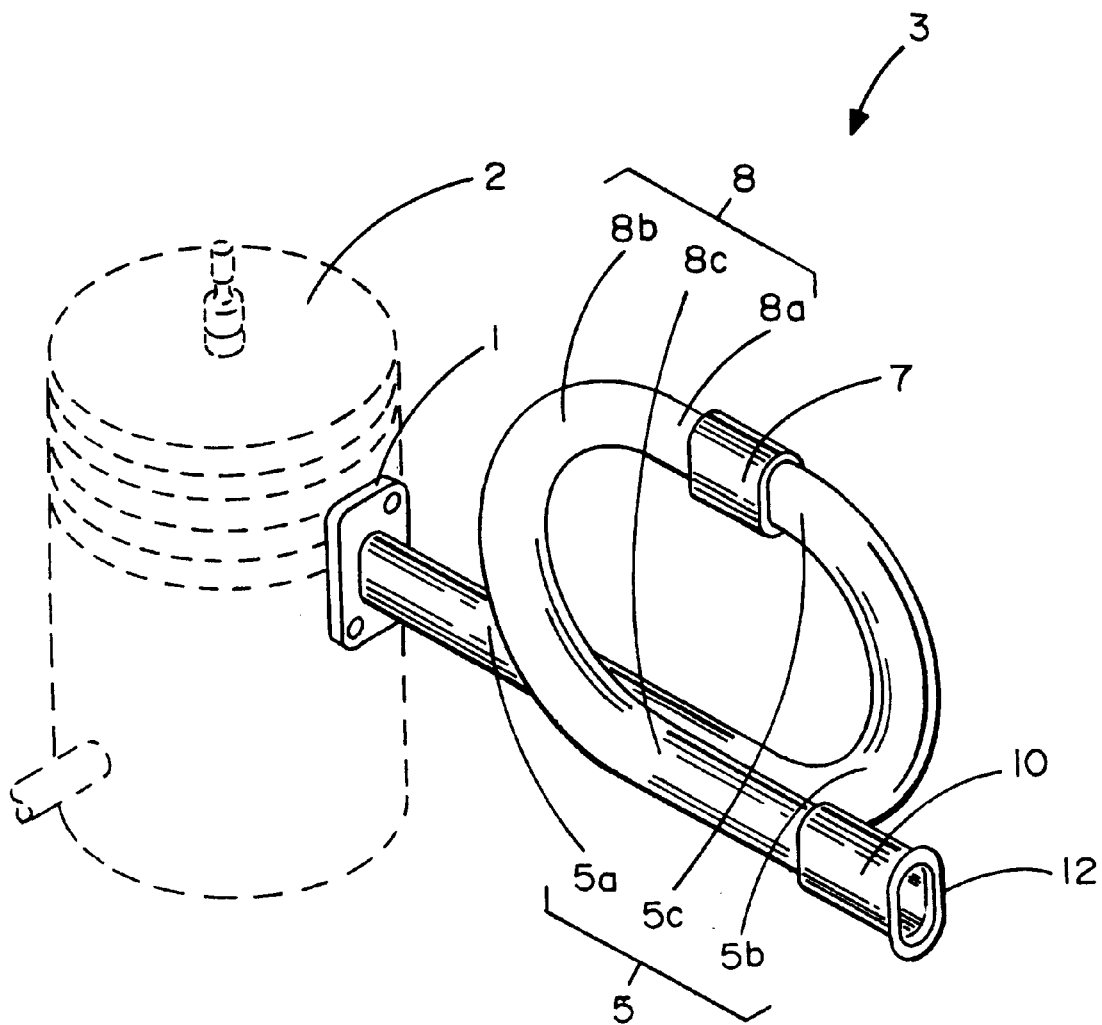
FIG. 1 is a perspective view of the exhaust pipe for an embodiment of the present invention.

As shown in FIG. 1, an embodiment of the present invention includes a first end flange 1 that bolts to the engine 2 at one end of the exhaust pipe 3. Welded or otherwise connected to the flange 1 is a first stage pipe portion 5, which has a first straight section 5a and a first bend section 5b at the end of the first straight section 5a. The first bend section 5b is "U shaped" so as to reverse the direction of the pipe 3. Following the bend 5b, the first stage portion 5 has a second straight section 5c. Connected to the end of straight section 5c by, for example, butt-welding, is an approximately one-inch long second stage pipe portion 7 having an enlarged inner diameter (e.g., 1.130 inches in one embodiment) from the inner diameter of first stage portion 5 (e.g., 0.990 inches in one embodiment). This enlarged inner diameter of the second stage portion 7 allows the traveling exhaust gases to expand and thereby pull exhaust from within the engine's cylinder by creating a vacuum pulse that returns to the engine from the second stage portion 7 via the first stage portion 5

Following second stage portion 7 and connected (e.g., butt-welded) to the second stage portion 7 is a straight section 8a of a third stage pipe portion 8, with the third stage portion 8 having a U shaped bend 8b that causes the pipe 3 to again reverse direction. Following bend 8b is a second straight section 8c of the third stage portion 8, terminating in an output or fourth stage pipe portion 10 having an enlarged inner diameter (e.g., 1.130 inches in one embodiment), with the enlarged inner diameter of the fourth stage portion 10 allowing the exhaust gases to expand, thereby pulling intake fuel and air gases into the engine's cylinder from the carburetor by sending a vacuum pulse back through the pipe 3 into the engine. This vacuum pulse also enhances swirling or mixing of intake air and fuel within the engine's cylinder. There may also be a strap or bracket attached to bend 8b for securing the pipe 3 relative to the engine. Also included with this embodiment is a washer 12 or a connected muffler.

It has been experimentally found that, if the exhaust pipe includes the two enlarged stage portions 7, 10, but the two stage portions 5, 8 having curved sections 5b, 8b are instead straightened out, that the performance increase is only about 50% of the improvement achieved by including the two curved sections 5b, 8b. In other words, the presence of the two enlarged stage portions 7, 10 results in about 50% of the performance increase benefit of the invention, and the presence of the two curved sections 5b, 8b results in the rest of the performance increase benefit of the invention.

The lengths of the various sections of exhaust pipes, combined with the changing inner diameters of the successive sections, combined with the placement of the bends in the pipes, produce the performance improvement of this invention. Also, the first bend 5b experimentally appears to be the more important of the two bend sections 5b, 8b.

The length of the first section 5a and the resulting placement of the second stage portion 7 has been experimentally determined, in combination with the speed of the exhaust gases through the pipe (corresponding to an engine RPM range), to cause the expansion of the gases in second stage portion 7 to occur at the correct time for drawing exhaust gases out of the engine's cylinder or cylinders. Similarly, the placement of the fourth stage portion 10 allows the traveling exhaust gases to expand at the proper moment to produce a vacuum pulse, causing a pulling of intake fuel and air gases into the engine's cylinder or cylinders from, for example, the carburetor and intake manifold. The first bend 5b has been experimentally determined to cause a change in direction of flow within the pipe, with the outside of the bend being about 100 degrees (Fahrenheit) cooler than the inside of bend 5b.

The exhaust or header pipe of the present invention is designed to improve the following engine breathing abilities: 1) the pipe assists the exhaust system by speeding up the first breath of exhaust that the exhaust valve expels as it just begins to open; 2) the pipe provides the engine with the ability to "scavenge" or "suck" remaining gases from the cylinder as the exhaust valve closes; 3) as a result, the pipe provides proper timing of a "vacuum" pulse that soars through the header pipe from the end of the pipe back into the engine's cylinder; when this pulse enters the cylinder, it assists the incoming intake air and fuel mixture; it basically "supercharges" the gas and air when they enter the cylinder; and 4) the pipe creates a phenomenon unlike any other header; after the intake mixture has been supercharged, the previous vacuum charge, that which assisted the initial mixture, creates a pressure pulse in the exhaust pipe that assists the exhaust system in pushing the remaining gases out the end of the pipe.

These events occur by precise timing of the header pipe with a selection of engine blocks, cam shafts, and other components that produce flows of different amounts of air, fuel, and exhaust. The present invention was developed utilizing mathematical equations, header pipe pressure tests and dynamometer testing to perfect this header pipe design.

Figure 2:
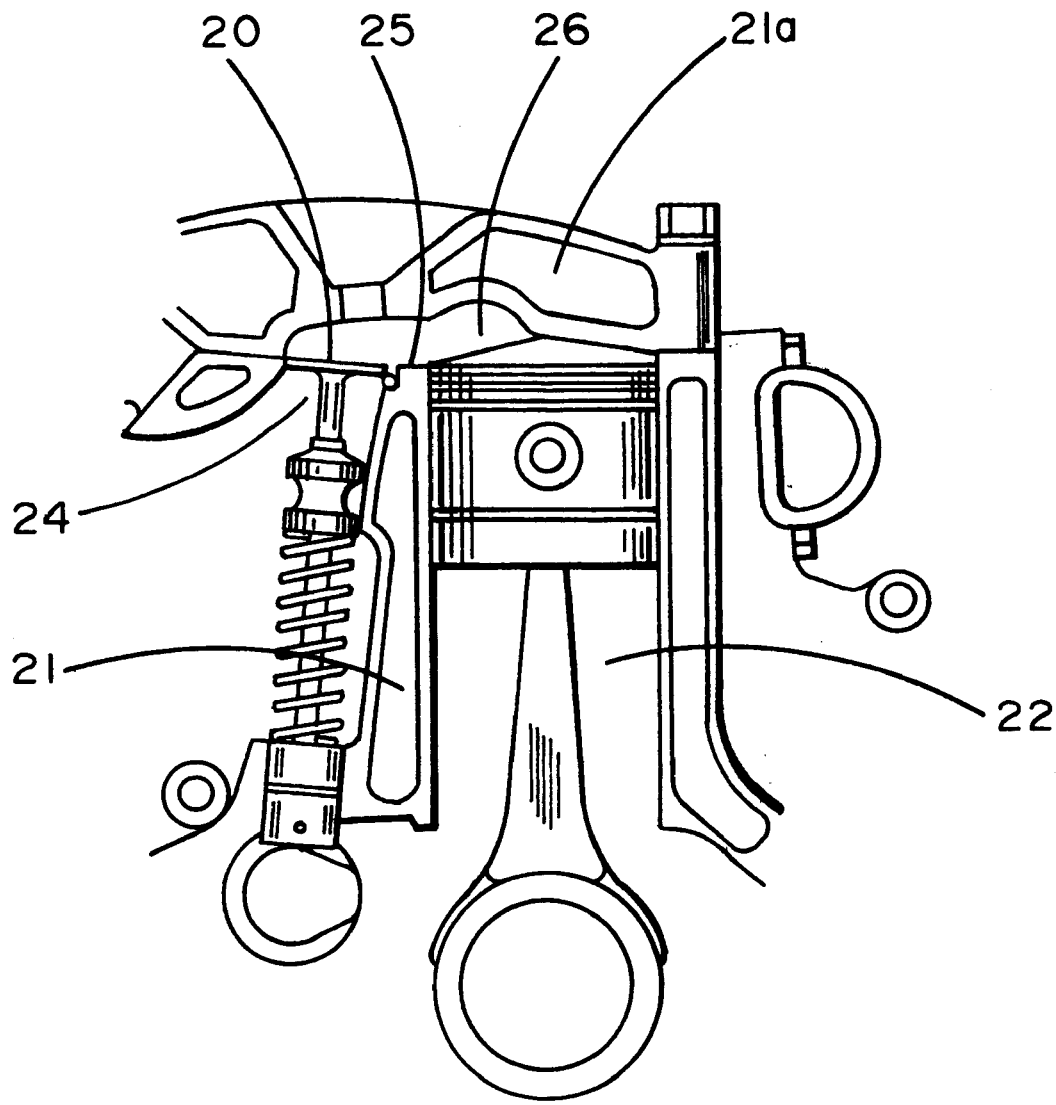
FIG. 2 shows a cross-sectional view of a typical flathead engine of the prior art for use in conjunction with an embodiment of the present invention.

Because certain types of engines naturally breathe better than others, those engines that do not breathe well are particularly amenable to enhanced engine performance using the present invention. For example, as shown in FIG. 2, flathead engines of the prior art generally have deficient intake air and fuel flew, as well as exhaust flow. Flathead engines have valves 20 in the block 21, rather than the head 21a (allowing for a characteristically "flat" head), so that the valves 20 do not open directly into the engine cylinder 22, as with overhead valve engines. The valves 20 generally open in a port 24 parallel to the cylinder 22. As a result, air and fuel flow into and exhaust flow out of the cylinder 22 must travel around a sharp bend 25 near the end 26 of the cylinder (referred to as the chamber area), decreasing engine performance over, for example, overhead valve engines. Typically, flathead engines also have other design elements less conducive to intake and exhaust flow, including valve size, valve design, valve seat design, port design, carburetor design, and cylinder head design. The present invention, by enhancing both intake and exhaust flow, particularly improves the performance of engines such as flathead engines.

Dimensions of the various parts of exhaust pipes in according to two embodiments of the present invention are presented in the table shown in FIG. 3.

Figure 4:
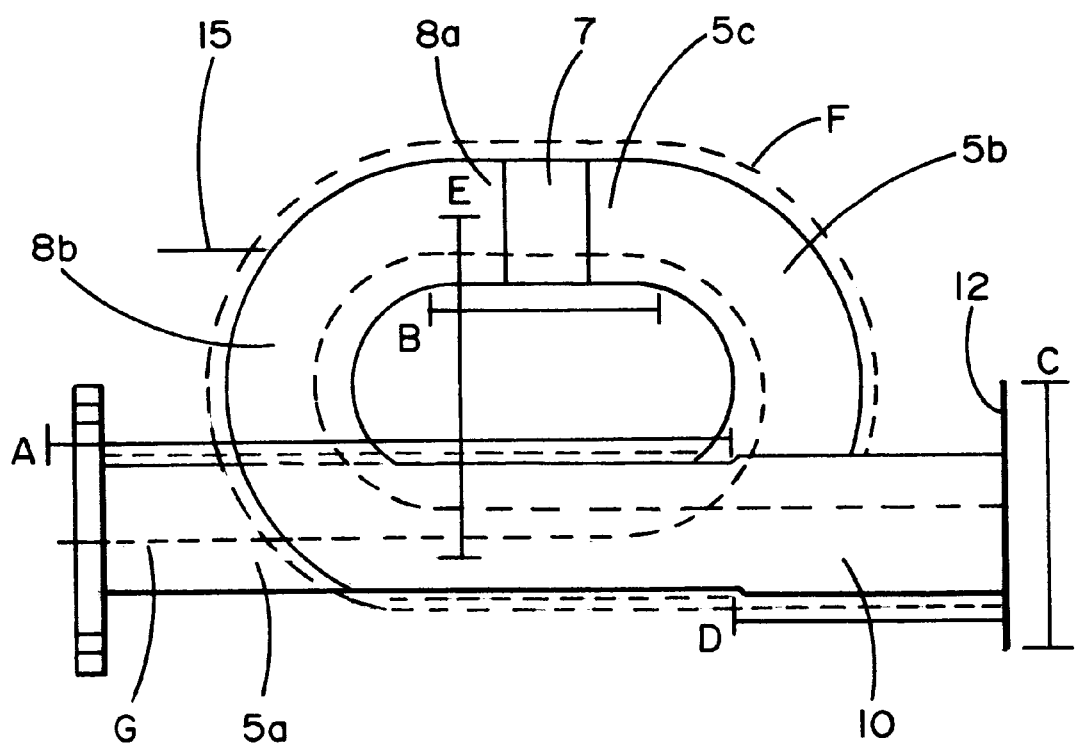
FIG. 4 is a plan view of the exhaust pipe for an embodiment of the present invention.

FIG. 4 shows a cross-sectional view of a header in accordance with the embodiment of FIG. 1, with the dimensional elements for a muffled pipe shown in FIG. 3 identified. In FIG. 4, the length of the first straight section 5a of the first stage portion 5 of the exhaust pipe 3 is labeled A. The combined length of the second straight section 5c of the first stage portion 5, the second stage portion 7, and the first straight section 8a of the third stage portion 8 is labeled B. The washer C for use without the muffler has a diameter of, for example, 2". The length of the fourth stage portion is labeled D. The centerline to centerline distance is labeled E. The outside total length of all stages is labeled F, and the inside total length of all stages is labeled G. A mounting feature 15, such as a strap, for mounting the exhaust pipe to the engine is also shown.

Figure 5:
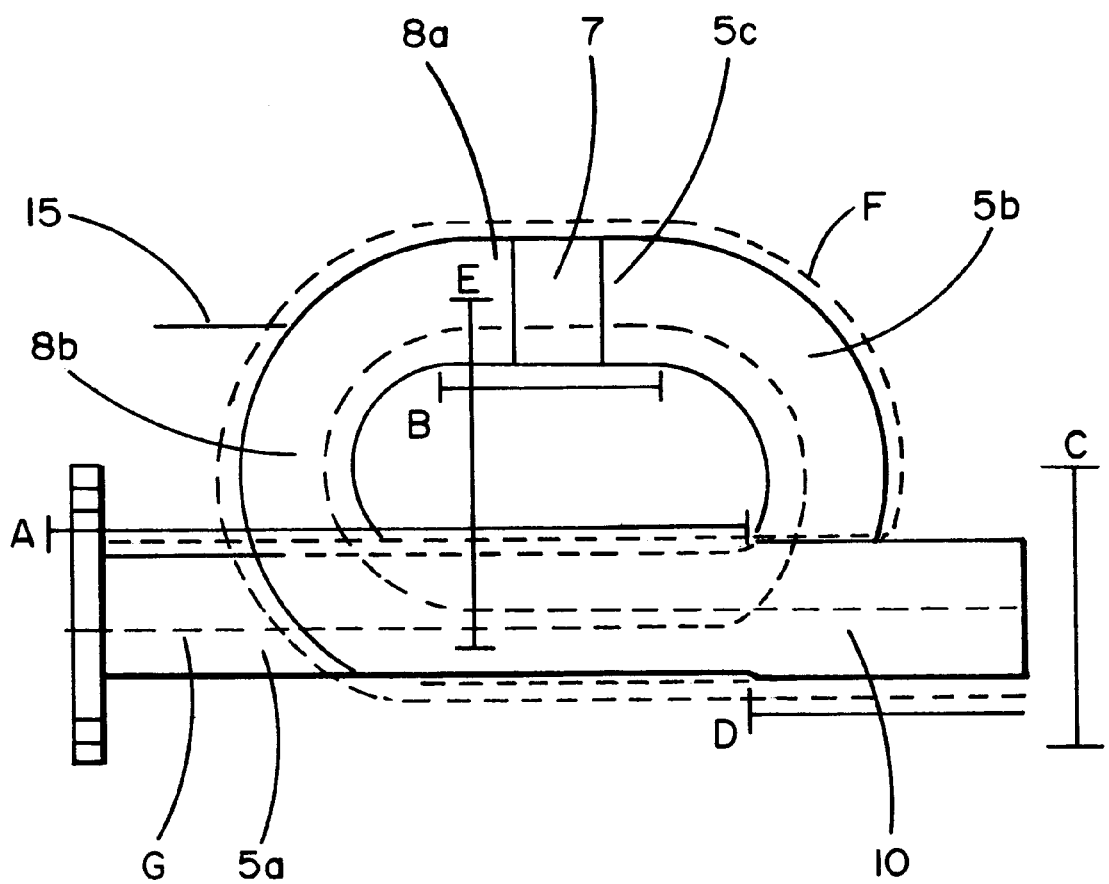
FIG. 5 is a plan view of the exhaust pipe for another embodiment of the present invention.

FIG. 5 presents the corresponding dimension shown in FIG. 4 for an unmuffled exhaust pipe in accordance with an embodiment of the present invention.

Embodiments of the present invention have now been described in fulfillment of the above identified advantages. It will be appreciated that these examples are merely illustrative of the invention. Many variations and modification, will be apparent to those skilled in the art.

I claim:

1. A double U shaped exhaust pipe for an exhaust flow from an internal combustion engine having at least one cylinder, the exhaust flow from the engine exiting the engine in a first direction, comprising:

a connecting portion for connecting the exhaust pipe to the engine;

a first stage exhaust pipe portion connected to the connecting portion, the first stage portion including:

a first straight pipe section having a first end and a second end, the first straight pipe section extending from the connecting portion at the first straight pipe section first end, wherein the first straight pipe section has a first inner pipe diameter;

a first curved pipe section having a first end and a second end, the first curved pipe section first end being attached to the first straight pipe section second end, wherein the first curved pipe section has the first inner pipe diameter, and wherein the first curved pipe section reverses the exhaust flow, such that the exhaust flow is in a second direction upon exiting the first curved pipe portion, the second direction opposite the first direction; and a second straight section having a first end and a second end, the second straight section first end being connected to the first curved pipe section second end, wherein the second straight section has the first inner pipe diameter;

a second stage exhaust pipe portion, the second stage portion including a third straight section having a first end and a second end, the third straight section first end being connected to the second straight section second end, wherein the third straight section has a second inner pipe diameter;

a third stage exhaust pipe portion, the third stage portion including:

a forth straight section having a first end and a second end, the forth straight section first end being connected to the third straight section second end, wherein the second straight section has the first inner pipe diameter;

a second curved pipe section having a first end and a second end, the second curved pipe section first end being attached to the forth straight pipe section second end, wherein the second curved pipe section has the first inner pipe diameter, and wherein the second curved pipe section reverses the exhaust flow, such that the exhaust flow upon existing the second curved pipe section is in the first direction; and a fifth straight section having a first end and a second end, the fifth straight section first end being connected to the second curved pipe section second end, wherein the second straight section has the first inner pipe diameter; and a fourth stage exhaust pipe portion, the fourth stage portion including a sixth straight section having a first end and a second end, the sixth straight section first end being connected to the fifth straight section second end, wherein the sixth straight section has the second inner pipe diameter;

wherein the second inner pipe diameter is greater than the first inner pipe diameter, such that the exhaust flow from the first inner pipe diameter into the second diameter pipe produces a vacuum pulse within the exhaust flow, the vacuum pulse returning to the engine and enhancing engine performance.

2. The exhaust pipe of claim 1, wherein the exhaust pipe has an overall length, and wherein the overall length of the exhaust pipe is no greater than a maximum allowed overall length under racing rules.

3. The exhaust pipe of claim 2, wherein the overall length is 39.25 inches.

4. The exhaust pipe of claim 1, wherein the engine has an engine performance that is variably enhanced with variations in the exhaust flow; wherein the exhaust flow has a varying exhaust flow speed; wherein each of the straight and curved sections has a length, such that each of the exhaust pipe portions has an exhaust pipe portion length; and wherein the length of the first stage portion is selected so that the exhaust gas flow expands into the second stage portion, such that the exhaust flow is drawn from the engine so as to enhance the engine performance.

5. The exhaust pipe of claim 4, wherein the curved sections each have a curvature; and wherein the curvature of each of the curved sections is selected such that the exhaust flow is drawn from the engine so as to enhance engine performance.

6. The exhaust pipe of claim 4, wherein the engine has an optimal operating speed range; wherein the exhaust flow from the engine is periodic, such that the engine exhaust flow has an associated engine exhaust period; wherein the exhaust flow through the first stage portion into the second stage portion has an associated first stage portion period, the first stage portion period varying with the length of the first stage portion; and wherein the length of the first stage portion is selected so as to enhance the exhaust flow by matching the period of the exhaust flow from the engine to the first stage portion period.

7. The exhaust pipe of claim 6, wherein the engine optimal operating speed range is about 5,000 to 6,500 revolutions per minute.

8. The exhaust pipe of claim 6, wherein the exhaust flow through the first stage portion into the second stage portion produces a first stage portion vacuum pulse, the first stage portion period including the first stage portion vacuum pulse.

9. The exhaust pipe of claim 6, wherein the exhaust flow through the first stage portion into the second stage portion produces an expansion of the exhaust flow.

10. The exhaust pipe of claim 9, wherein the exhaust flow has an associated speed of flow, and wherein the exhaust flow through the first stage portion into the second stage portion increases of the speed of the exhaust flow.

11. The exhaust pipe of claim 8, wherein the engine includes at least one exhaust valve, the at least one exhaust valve periodically opening and closing; and wherein the engine exhaust period varies with the periodic opening and closing of the exhaust valve.

12. The exhaust pipe of claim 11, wherein the engine exhaust flow is enhanced by the first stage portion vacuum pulse reaching the engine during the opening of the at least one exhaust valve.

13. The exhaust pipe of claim 6, wherein the engine operating speed is variable; and wherein the engine exhaust period and the first stage portion period vary with the variable engine operating speed.

14. The exhaust pipe of claim 13, wherein the first stage portion period varies with variation in the second inner pipe diameter.

15. The exhaust pipe of claim 13, wherein the engine has a preferred operating speed range; and wherein the length of the first stage portion is selected to match the first stage portion period to the engine exhaust period for the preferred operating speed range.

16. The exhaust pipe of claim 4, wherein the engine has an operating speed; wherein the exhaust flow from the engine is periodic, such that the exhaust flow from the engine has an associated engine exhaust period; wherein the engine has a periodic intake flow, the periodic intake flow affecting the exhaust flow, such that the exhaust flow has an associated engine intake period;

wherein the exhaust flow through the first stage portion into the second stage portion has a first stage portion period, the first stage portion period varying with the length of the first stage portion;

wherein the exhaust flow through the third stage portion into the fourth stage portion has a third stage portion period, the third stage portion period varying with the length of the third stage portion; and wherein the length of the first stage portion and the length of the third stage portion are selected so as to enhance the exhaust flow by matching the first stage portion period and the second stage portion period to the engine exhaust period and the engine intake period.

17. The exhaust pipe of claim 16, wherein the engine operating speed is variable; and wherein the engine exhaust period, the engine intake period, the first stage portion period, and the third stage portion period vary with the variable engine operating speed.

18. The exhaust pipe of claim 17, wherein the first stage portion period and the third stage portion period vary with varying of the second inner pipe diameter.

19. The exhaust pipe of claim 17, wherein the engine has an optimal operating speed; and wherein the length of the first stage portion and the length of the third stage portion are selected to match the first stage portion period and the third stage portion period to the engine exhaust period and the engine intake period for the optimal engine operating speed.

20. The exhaust pipe of claim 19, wherein the curved sections each have a curvature; and wherein the curvature of each of the curved sections is selected such that the exhaust flow is drawn from the engine so as to enhance engine performance.

21. The exhaust pipe of claim 16, wherein the engine is a four stroke engine.

22. The exhaust pipe of claim 16, wherein the engine is a flathead engine.

23. The exhaust pipe of claim 21, wherein the engine includes at least one intake valve, the at least one intake valve periodically opening and closing, and at least one exhaust valve, the at least one exhaust valve periodically opening and closing; wherein the engine exhaust period varies with the periodic opening and closing of the at least one exhaust valve; and wherein the engine intake period varies with the periodic opening and closing of the at least one intake valve.

24. The exhaust pipe of claim 23, wherein the engine intake period varies with the opening and closing of the at least one intake valve and the opening and closing of the at least one exhaust valve.

25. The exhaust pipe of claim 23, wherein the exhaust flow from through the first stage portion into the second stage portion produces a first stage portion vacuum pulse, the first stage portion period including the first stage portion vacuum pulse; and wherein the exhaust flow from through the third stage portion into the fourth stage portion produces a third stage portion vacuum pulse, the third stage portion period including the third stage portion vacuum pulse.

26. The exhaust pipe of claim 24, wherein the engine exhaust flow is enhanced by the first stage portion vacuum pulse reaching the engine during the opening of the at least one exhaust valve.

27. The exhaust pipe of claim 25, wherein the engine exhaust flow is enhanced by the third stage portion vacuum pulse reaching the engine during the opening of the at least one intake valve.

28. The exhaust pipe of claim 27, wherein the engine includes at least one cylinder that communicates with the intake valve and the exhaust valve; wherein exhaust gas is contained in the at least one cylinder during the opening of the exhaust valve; and wherein the engine exhaust flow is enhanced by the third stage portion vacuum pulse scavenging the engine exhaust from the at least one cylinder via the opening exhaust valve.

29. The exhaust pipe of claim 27, wherein the engine includes at least one cylinder; wherein intake fuel and gas are drawn into the at least one cylinder via the intake valve during the opening of the intake valve, the fuel and gas mixing when drawn into the at least one cylinder; and wherein the third stage portion vacuum pulse enhances the engine performance by increasing the mixing of the drawn fuel and gas within the at least one cylinder.

30. The exhaust pipe of claim 27, wherein the third stage portion vacuum pulse enhances intake into the engine.

31. The exhaust pipe of claim 30, wherein the intake includes intake of fuel and air.

32. The exhaust pipe of claim 30, wherein the enhanced intake into the engine enhances engine performance.

33. The exhaust pipe of claim 26, wherein the third stage portion vacuum pulse and the closing of the exhaust valve combine to produce an exhaust pipe pressure pulse, the exhaust pipe pressure pulse enhancing the exhaust flow by forcing exhaust gas from the exhaust pipe via the second end of the sixth straight section of the fourth stage portion.

34. The exhaust pipe of claim 1, further comprising a muffler attached to the second end of the sixth straight section.

35. The exhaust pipe of claim 2, further comprising a muffler attached to the second end of the sixth straight section, wherein the overall length is 37.25 inches.

36. A method for enhancing performance for an optimal range of operation of an internal combustion engine having at least one cylinder and an exhaust flow through a double U shaped exhaust pipe of a selected maximum overall length, the exhaust pipe having a first partially curved section of a first inner diameter, the first end being connected to the internal combustion engine; a second straight section of a second inner diameter, the second straight section being connected to the first partially curved section; a third partially curved section of the first inner diameter, the third partially curved section being connected to the second straight section; and a fourth straight section of the second inner diameter, the fourth straight section being connected to the third partially curved section; wherein the second inner diameter is greater than the first inner diameter; and wherein the exhaust flow includes an exhaust pulse and an intake pulse; the method comprising:

receiving the exhaust flow from the internal combustion engine into the first partially curved section;

the exhaust flow traveling from the first partially curved section to the second straight section;

the exhaust flow into the second straight section creating a first vacuum pulse returning via the first partially curved section to the internal combustion engine;

the exhaust flow traveling from the second straight section to the third partially curved section;

the exhaust flow traveling from the third partially curved section to the fourth straight section; and the exhaust flow into the fourth straight section creating a second vacuum pulse returning via the third partially curved section, the second straight section, and the first partially curved section to the internal combustion engine;

wherein the first vacuum pulse and the second vacuum pulse reach the engine during the exhaust pulse and the intake pulse for the optimal range of operation of the internal combustion engine.

* * * * *